US008814185B2

(12) United States Patent
Luttinen et al.

(10) Patent No.: US 8,814,185 B2
(45) Date of Patent: Aug. 26, 2014

(54) RIDE STEER ADJUSTMENT DEVICE AND METHOD OF ADJUSTING RIDE STEER

(71) Applicant: GM Global Technology Operations LLC, Detroit, MI (US)

(72) Inventors: James L. Luttinen, Brighton, MI (US); Timothy J. Schabel, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/633,938

(22) Filed: Oct. 3, 2012

(65) Prior Publication Data
US 2014/0091542 A1 Apr. 3, 2014

(51) Int. Cl.
| B62D 17/00 | (2006.01) |
| B62D 7/06 | (2006.01) |
| B62D 7/16 | (2006.01) |
| B62D 7/20 | (2006.01) |
| F16D 1/12 | (2006.01) |
| F16C 11/06 | (2006.01) |

(52) U.S. Cl.
USPC ............ 280/86.758; 280/93.511; 280/93.512; 403/83

(58) Field of Classification Search
USPC .............. 280/86.758, 86.75, 86.756, 93.511, 280/93.51, 93.512, 93.502, 93.507; 180/400, 435, 436, 437, 438, 440; 403/83, 127, 181
See application file for complete search history.

(56) References Cited

U.S. PATENT DOCUMENTS

| 2,512,881 | A * | 6/1950 | Smiley, Jr. .................... 384/396 |
| 2,732,233 | A * | 1/1956 | MacMillan et al. .......... 403/181 |
| 7,201,530 | B2 * | 4/2007 | Wappes et al. ................. 403/27 |

* cited by examiner

*Primary Examiner* — Keith Frisby
(74) *Attorney, Agent, or Firm* — Quinn Law Group, PLLC

(57) ABSTRACT

A ride steer adjustment device for a vehicle includes an insert sleeve that has an opening configured so that the insert sleeve has an interference fit with a tie rod ball stud when the tie rod ball stud extends through the opening. The insert sleeve has external threads and is configured to be threaded to the knuckle steer arm at the external threads. A distance between the knuckle steer arm and the tie rod is adjustable by turning the insert sleeve relative to the knuckle steer arm at the external threads. Adjusting the distance between the knuckle steer arm and the tie rod changes the angle of the tie rod and thereby the ride steer.

11 Claims, 3 Drawing Sheets

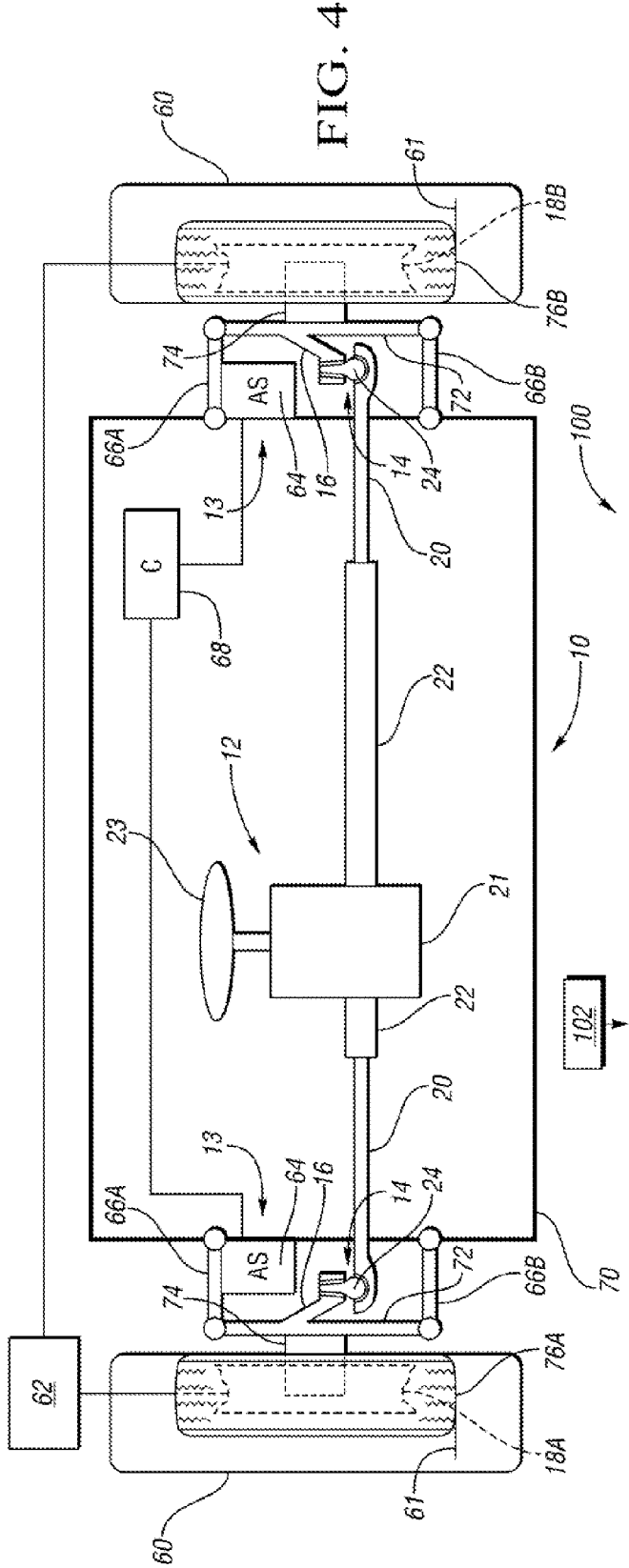

RIDE STEER ADJUSTMENT DEVICE AND METHOD OF ADJUSTING RIDE STEER

TECHNICAL FIELD

The present teachings generally include a device to adjust ride steer in a vehicle and a method of adjusting ride steer.

BACKGROUND

Vehicle steering systems and suspension systems are comprised of a number of interconnected components. The dimensional variation of the components and the geometric variation introduced at joints can create a variation in ride steer greater than a threshold amount, thereby requiring an adjustment to correct the ride steer. "Ride steer" is the change in the toe angle of a vehicle wheel that occurs with suspension ride travel (i.e., the toe in or toe out of a wheel, from top to bottom, that occurs as the suspension system moves up and down while the vehicle travels over the road).

Automotive suspensions are designed to minimize the transmission of vertical forces into a vehicle body (suspend) while creating the lateral forces required for directional control (path following). Typical suspension linkage mechanisms are configured to tip the top of the tire inboard (change camber) as the wheel moves up to maintain a desired orientation of the tire to the road surface when the vehicle body rolls relative to the ground while cornering. Because automotive tires produce lateral forces primarily due to differences between the direction that the tire is rolling versus the direction of travel across the ground (slip angle), the suspension mechanism must also control any ride steer (toe change) when a wheel moves vertically. Ride steer is relatively sensitive to the angle of the tie rod.

The number of chassis components that are assembled to create a suspension system plus the dimensional variation of parts and the geometric variation introduced at joints can create variation in ride steer that is greater than an optimally acceptable amount.

Previous ball joints have included an externally-threaded split sleeve that screws into the knuckle steer arm. A tapered ball stud then engages a tapered inner diameter of the split sleeve to expand the sleeve, locking it to the knuckle steer arm. However, such a sleeve is not configured to adjust ride steer height, because, due to its split nature, the sleeve is only securely engaged to the knuckle steer arm at the initial assembly position. Ride steer cannot be adjusted without disassembling the split sleeve, the knuckle steer arm, and the tapered ball stud.

Some suspension systems utilize active suspension technology that minimizes vertical disturbances of the vehicle body by either pulling the tire up or pushing the tire down a controlled amount under the direction of a controller to follow road profile changes, with active (i.e., controllable) force generation components used in place of springs. With minimized vertical disturbances, lateral disturbances are more easily perceived. Additionally, because tires generate lateral forces when rolling at a slip angle to the direction of travel, active suspensions demand near zero ride steer to minimize unwanted lateral force disturbances.

SUMMARY

A ride steer adjustment device for a vehicle steering assembly is provided that enables easy and precise adjustment of ride steer on a vehicle without requiring any disassembly of the steering system and without sacrificing durability. The ride steer adjustment device includes an annular insert sleeve that has a central opening configured so that the insert sleeve has an interference fit with a tie rod ball stud when the tie rod ball stud extends through the central opening. The insert sleeve has external threads configured to be threaded to internal threads defined at an inner surface of the knuckle steer arm at an opening in the knuckle steer arm. A distance between the knuckle steer arm and the tie rod is adjustable by turning the insert sleeve to move the external threads relative to internal threads of the knuckle steer arm. Accordingly, adjusting the distance between the knuckle steer arm and the tie rod changes the angle of the tie rod and thereby the ride steer.

The insert sleeve can have a flange at an outer edge that defines detents. The flange is configured to be positioned between the knuckle steer arm and the tie rod when the insert sleeve is threaded into the knuckle steer arm. The ride steer adjustment device may also include a pin that extends through another opening in the knuckle steer arm adjacent the tie rod ball stud. The pin is also referred to herein as a clocking bolt or clocking pin, and is configured to be selectively positionable to contact the flange at any one of the detents to lock the insert sleeve, and selectively retractable to permit the insert sleeve to be turned. The distance between the knuckle steer arm and the tie rod is thereby adjustable by turning the flange and moving the external threads of the insert sleeve along the internal threads of the knuckle steer arm.

The knuckle steer arm may have a boss ring that has a split and that defines the opening with the internally-threaded surface. The device can include a pinch bolt extending through the boss ring across the split. The pinch bolt is configured to be turnable in one direction to loosen the boss ring around the insert sleeve to ease adjustment of the insert sleeve, and in an opposing direction to tighten the boss ring around the insert sleeve after the adjustment.

Because the ride steer adjustment device acts to adjust a distance between the knuckle steer arm and the tie rod, only the ride steer of the vehicle wheel connected to the knuckle steer arm is affected. That is, the adjustment device does not affect the ride steer of both of the front wheels, as would be the case if the adjustment required raising the center link of the steering assembly or the like. More precise ride steer adjustment is therefore enabled.

The adjustment device enables a method of adjusting vehicle ride steer that includes measuring a parameter indicative of ride steer of a wheel of the vehicle on an alignment machine, determining an adjustment to a distance between a tie rod and a knuckle steer arm based on the measured parameter to achieve a predetermined, optimal ride steer. A pin extending through the knuckle steer arm is then retracted to unlock a flange that extends from an insert sleeve threaded into the knuckle steer arm. The flange can then be turned to move the insert sleeve and a tie rod ball stud fit to the insert sleeve relative to the knuckle steer arm, thereby adjusting a distance between the tie rod and the knuckle steer arm. For example, the flange can be turned a prescribed number of flange detents past the retracted pin in a prescribed direction. Notably, the adjustment method does not require disassembly of any of the suspension or steering components.

The above features and advantages and other features and advantages of the present teachings are readily apparent from the following detailed description of the best modes for carrying out the present teachings when taken in connection with the accompanying drawings.

BRIEF DESCRIPTION OF THE DRAWINGS

FIG. 4 is a schematic illustration of a front portion of a vehicle with the steering system of FIG. 1 on an alignment machine.

FIG. 5 is a flow chart of a method of adjusting ride steer.

DETAILED DESCRIPTION

Figure 1:
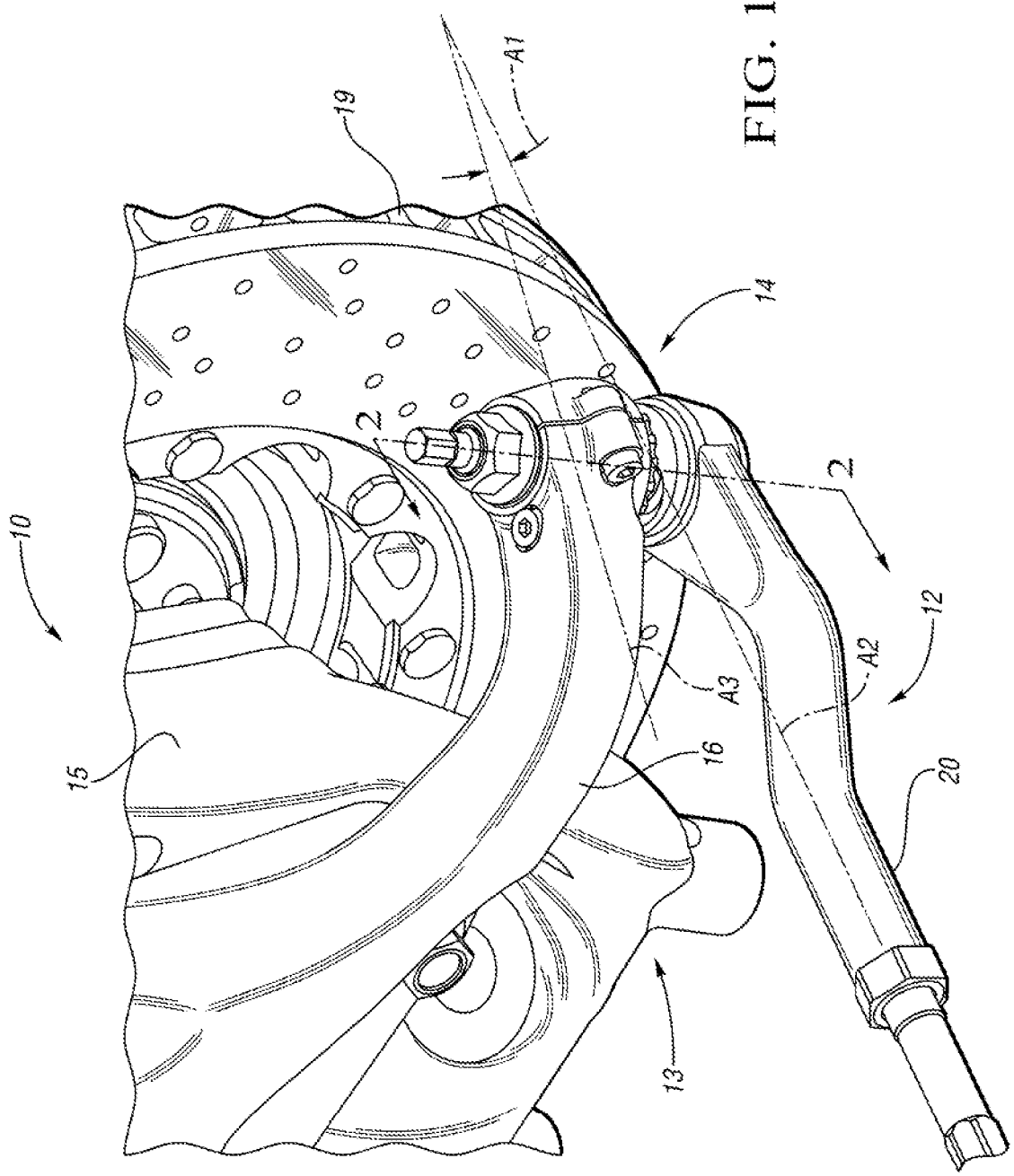
FIG. 1 is a schematic illustration in fragmentary perspective view of a portion of a vehicle suspension system and steering system, showing a ride steer adjustment device.

Referring to the drawings, wherein like reference numbers refer to like components throughout the several views, FIG. 1 shows a portion of a vehicle 10 with a portion of a steering system 12 and suspension system 13 that includes a ride steer adjustment device 14. As explained herein, the ride steer adjustment device 14 enables easy and precise adjustment of ride steer on an assembled vehicle 10 at any time during the life of the vehicle 10, without requiring disassembly of any portion of the vehicle 10.

Figure 2:
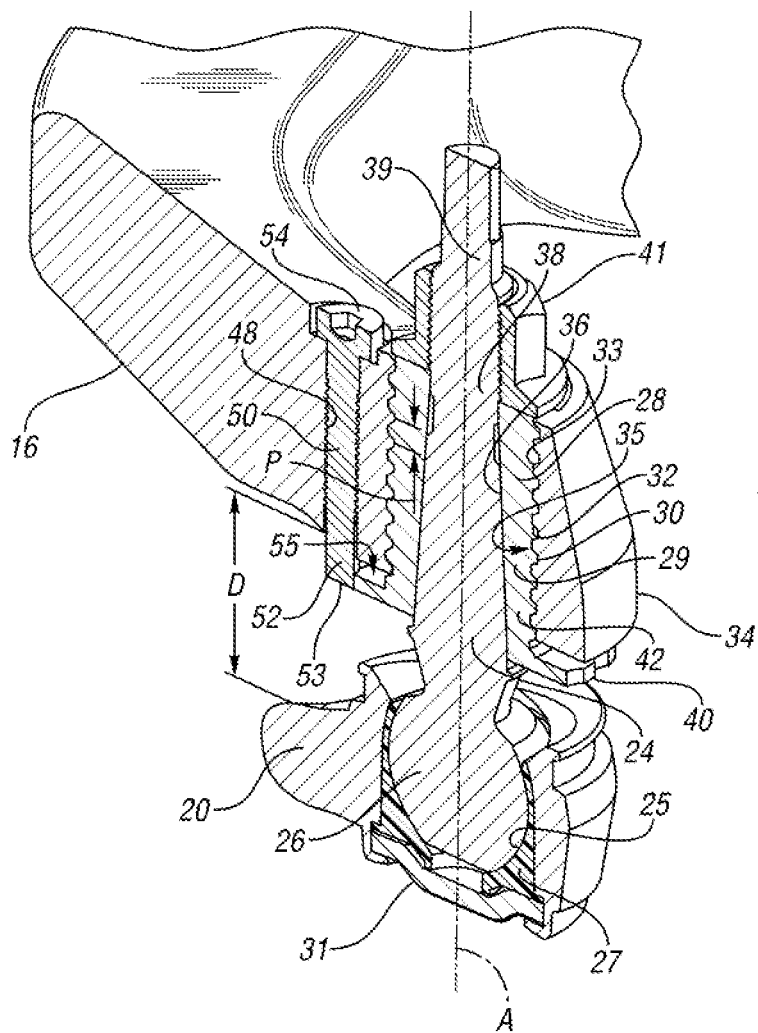
FIG. 2 is a schematic illustration in fragmentary perspective and cross-sectional view of the suspension system, steering system and ride steer adjustment device taken at line 2-2 in FIG. 1.

Specifically, the steering system 12 has a tie rod 20 connected to the knuckle steer arm 16 of the steering knuckle 15. A brake rotor 19 is connected to the steering knuckle 15. The brake rotor 19 is mounted to the driver-side front wheel 18A of FIG. 4. As shown in FIG. 4, the steering system 12 has a tie rod 20 operatively connected to a steering center link 22 that is connected via gearing and other components to a steering column 21 and ultimately controlled by a steering wheel 23. As best shown in FIG. 2, a tie rod ball stud 24 has a ball portion 26 seated in a ball pocket 25 of the tie rod 20. The ball portion 26 can rotate relative to the tie rod 20 as it moves with the knuckle steer arm 16 relative to the tie rod 20. As shown in FIG. 2, a bushing 27 is fit in the pocket 25 to reduce resistance to rotation of the ball portion 26 relative to the tie rod 20. The bushing 27 can be nylon, plastic, or other suitable material. A cap 31 supports the bushing 27 within the pocket 25.

The device 14 includes an insert sleeve 28 positioned between the tie rod ball stud 24 and the knuckle steer arm 16. The insert sleeve 28 can be steel or any other suitable material. The insert sleeve 28 has a portion 29 with external threads 30 that mate with internal threads 32 of an inner surface 35 of the knuckle steer arm 16 in an opening 33 of a boss ring 34 of the knuckle steer arm 16. The opening 33 is referred to herein as a first opening of the knuckle steer arm 16. This allows the insert sleeve 28 to be threaded to the knuckle steer arm 16 to a predetermined initial position upon initial assembly of the vehicle 10. The predetermined initial position establishes an initial distance D between the knuckle steer arm 16 and the tie rod 20, as further discussed herein. The tie rod ball stud 24, the insert sleeve 28 and the knuckle steer arm 16 do not move relative to one another during operation of the vehicle 10, although the relative position of the insert sleeve 28 and tie rod ball stud 24 to the knuckle steer arm 16 can be adjusted as described herein to provide desired ride steer.

The insert sleeve 28 is generally annular, with a center opening 36 that is coaxial with the external threads 30. The center opening 36 is configured so that the insert sleeve 28 has an interference fit with a stud portion 38 of the tie rod ball stud 24 when the tie rod ball stud 24 extends through the center opening 36. Specifically, the stud portion 38 has a generally frustoconical shape. The insert sleeve 28 is shaped so that the center opening 36 is tapered with a matching frustoconical shape to provide the interference fit with the tie rod ball stud 24. That is, when the tie rod ball stud 24 is inserted into the opening 36 from below the knuckle steer arm 16 upon assembly, the outer surface of the tie rod ball stud 24 will contact the inner surface of the insert sleeve 28 at the opening 36, creating the interference fit. A threaded portion 39 of the tie rod ball stud 24 extends beyond the insert sleeve 28. A threaded nut 41 is placed around the tie rod ball stud 24 at the threaded portion 39 to maintain the position of the tie rod ball stud 24 relative to the insert sleeve 28.

Figure 3:
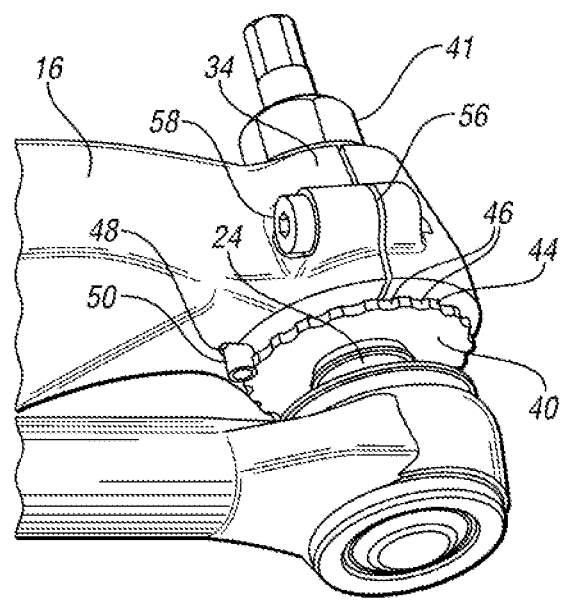
FIG. 3 is a schematic illustration in fragmentary perspective view of the ride steer adjustment device of FIGS. 1 and 2.

Once the insert sleeve 28 and the tie rod ball stud 24 are installed in the knuckle steer arm 16 with the ball portion 26 resting in the ball pocket 25 of the tie rod 20, adjustments to ride steer can be made without disassembling the components. That is, the insert sleeve 28 and tie rod ball stud 24 can be moved up and down along a vertical axis A through the tie rod ball stud 24 by turning the insert sleeve 28 relative to the knuckle steer arm 16 to move the external threads 30 along the internal threads 32. To assist in turning the insert sleeve 28, the insert sleeve 28 can be configured with a flange 40 that extends radially from the annular body portion 42 of the insert sleeve 28. The flange 40 can circumscribe the entire tie rod ball stud 24, as best shown in FIG. 3. The flange 40 has an outer edge 44 that defines detents 46, and is positioned between the knuckle steer arm 16 and the tie rod 20 when the insert sleeve 28 is threaded into the knuckle steer arm 16.

The knuckle steer arm 16 has another threaded opening 48 adjacent to and generally parallel with the opening 33 of the boss ring 34. The threaded opening 48 is referred to herein as a second opening of the knuckle steer arm 16. A threaded pin 50, also referred to as a clocking bolt or clocking pin, extends through the threaded opening 48. The flange 40 and the pin 50 are configured so that the pin 50 can be positioned in contact with the flange 40 to engage a detent 46 to prevent rotation of the insert sleeve 28 relative to the knuckle steer arm 16. The end portion 52 of the pin 50 that contacts the flange 40 is not threaded. The pin 50 can be retracted by a tool inserted in the head portion 54 so that the bottom 53 of the pin 50 clears the flange 40 by being at a position higher than the upper surface 55 of the flange 40, thereby unlocking the flange 40. The unlocked flange 40 can then be turned, moving the insert sleeve 28 along the internal threads 32 for a net up or down movement along axis A. With the movement of the insert sleeve 28, the tie rod ball stud 24 that is interference fit to the insert sleeve 28 also moves, as does the tie rod 20, due to the ball portion 26 captured in the ball pocket 25. A distance D between the knuckle steer arm 16 and the tie rod 20 will thus also be varied. Alternatively, the distance D can be measured between an effective center axis A2 of the tie rod 20 and an effective center axis A3 of the knuckle steer arm 16, or any other generally vertical distance gauged between the tie rod 20 to the knuckle steer arm 16. As the distance D changes, the angle A1 of the effective center axis A2 of the tie rod 20 to the effective center axis A3 of the knuckle steer arm 16 necessarily also changes, thus changing the resulting ride steer of the wheel 18A.

To increase the ease with which the insert sleeve 28 can be turned, the boss ring 34 of the knuckle steer arm 16 can be a split ring. That is, the boss ring 34 can have a split 56, as shown in FIG. 3. The boss ring 34 can be configured so that a pinch bolt 58 can extend through the boss ring 34 across the split 56. The pinch bolt 58 can be configured to be turnable in one direction, such as clockwise, to loosen the boss ring 34 around the insert sleeve 28 by allowing the split 56 to slightly widen. The lash between the internal threads 32 and the external threads 30 is increased by loosening the pinch bolt 58 and allowing the boss ring 34 to slightly expand, decreasing the resistance to adjustment of the insert sleeve 28 by the turning of the flange 40. After the desired adjustment of the position of the insert sleeve 28, the pinch bolt 58 can then be turned in an opposing direction, such as counterclockwise, to tighten the boss ring 34 around the insert sleeve 28, reducing the lash between the threads 30, 32 and securing the relative position of the insert sleeve 28, the tie rod ball stud 24, and the tie rod 20 to the knuckle steer arm 16.

The number of detents 46 of the flange 40 and the thread pitch P of the external threads 30 can be selected to achieve a desired adjustment in the distance D with each detent 46 that passes the retracted pin 50 as the insert sleeve 28 is turned. For example, the flange 40 can have twenty detents 46, and the external threads 30 can have a thread pitch P of two millimeters. Turning the insert sleeve 28 so that one detent 46 passes the pin 50 will then cause the distance D to be adjusted by substantially one tenth of one millimeter. The retracted pin 50 is thus used as a visual reference indicator to help achieve the desired adjustment. After the flange 40 of the insert sleeve 28 is turned to a desired adjusted position, the retracted pin 50 is repositioned to be in contact with a flange detent 46 by turning a tool (not shown) inserted in the head 54 to lock the flange 40, the insert sleeve 28, and the tie rod ball stud 24 at the adjusted position.

FIG. 4 shows a front portion of the vehicle 10 placed on an alignment machine 60. The alignment machine 60 is operatively connected to each of the driver-side front wheel 18A and the passenger-side front wheel 18B. A computer 62 receives information regarding the alignment of each of the wheels 18A, 18B relative to other components on the vehicle 10 as determined by the alignment machine 60. For example, the computer 62 can receive information concerning the ride steer of each of the wheels 18A, 18B. The steering system 12 and portions of the suspension system 13 are shown only schematically in FIG. 4. The steering system 12 shows the tie rod 20, the knuckle steer arm 16, and the tie rod ball stud 24 with the adjustment device 14. The tie rod 20 is connected to the center steering link 22 of the steering system 18. The passenger-side wheel 18B has substantially identical components operatively connected thereto, including a knuckle steer arm 16, a tie rod 20 and a tie rod ball stud 24 with a separate adjustment device 14. The suspension system 13 includes an upper control arm 66A and a lower control arm 66B at each wheel 18A, 18B. Each control arm 66A, 66B is pivotably connected to a frame portion of the vehicle body 70 and to a steering knuckle 72, of which the knuckle steer arm 16 is one portion. The knuckle steer arm 16 extends out of the page in FIG. 4. A wheel bearing 74 connects the steering knuckle 72 to the wheel 18A or 18B, and allows the wheel 18A or 18B to rotate relative to the steering knuckle 72. Tires 76A, 76B are mounted on the wheels 18A, 18B. Various sensors of the alignment machine 60 relay the relative position of the wheel 18A to a stationary member 61 such as the floor or other level surface, and the relative position of the wheel 18B to the stationary member. Ride toe and ride steer can be calculated by an algorithm stored in the computer 62 based on the sensed information. The algorithm can then determine a necessary adjustment to the distance D of FIG. 2 that will result in a desired ride steer.

Adjusting the distance D of FIG. 2 to change the ride steer on the driver-side wheel 18A does not affect the ride steer of the passenger-side wheel 18B. The adjustment device 14 adjacent the passenger-side wheel 18B can be separately adjusted.

As indicated in FIG. 4, an active suspension system (AS) 64 is operatively connected to the vehicle body 70 and to the upper control arm 66A of the driver-side wheel 18A and to the upper control arm 66B of the passenger-side wheel 18B. The active suspension 64 may be any type of controllable suspension, such as a magnetorheological strut or the like, that can be controlled by a controller 68, based on sensed feedback from position sensors to provide controlled forces on the vehicle body 70 to counteract road forces and substantially negate all ride-induced up and down motion of the vehicle body 70. With the vertical forces negated by the active suspension system 64, fore-aft and lateral forces may be more noticeable to a vehicle occupant. By enabling optimum ride steer to be achieved, the adjustment device 14 can reduce the lateral forces on the body 70.

A method of adjusting ride steer 100 is shown in the flowchart of FIG. 5. The method 100 can be used on a vehicle with any of a variety of types of suspensions systems, including an active suspension system. The method 100 begins with block 102, measuring a parameter indicative of the ride steer of a wheel 18A (or 18B) of the vehicle 10 on an alignment machine 60. Under the method 100, an adjustment to the distance D between the tie rod 20 and the knuckle steer arm 16 can then be determined in block 104. The adjustment is based on the measured parameter of block 102, and is the adjustment necessary to achieve a predetermined ride steer. The predetermined ride steer and the algorithm relating ride steer to the distance D between the tie rod 20 and the knuckle steer arm 16 are stored in a processor of the computer 62, which carries out the algorithm.

Once the adjustment is calculated in block 104, the pin 50 can be retracted in block 106 to unlock the flange 40. The retracting and positioning of the pin 50 can be by a tool (not shown) inserted into the head portion 54 of the pin 50. The pinch bolt 58 on the split boss ring 34 of the knuckle steer arm 16 can then be loosened in block 108 to provide increased lash between the external threads 30 and the internal threads 32. The increased lash will enable ease of moving the insert sleeve 28, which is accomplished in block 110 by turning the flange 40 that extends from the insert sleeve 28 threaded into the knuckle steer arm 16. Turning the flange 40 moves not only the insert sleeve 28, but also a tie rod ball stud 24 fit to the insert sleeve 28, and the tie rod 20 in which the tie rod ball stud 24 rests, to achieve the calculated adjustment.

Optionally, the required direction of turning flange 40 and the number of detents 46 that must pass the retracted pin 50 can be calculated by the algorithm stored in the controller 68 prior to block 110, and block 110 can be carried out based on the calculated number of detents 46. Alternatively, turning the flange 40 can be based on reading a conversion chart, or in the case of a controller 62, a look-up table, relating adjustment distance to number of detents 46 that must pass the retracted pin 50. After turning the flange 40 in block 110, the clocking pin 50 is repositioned to engage a flange detent 46 to lock the insert sleeve 28 and tie rod ball stud 24 relative to the knuckle steer arm 16 in block 112, and thereby maintain the adjusted distance D. The pinch bolt 58 is tightened in block 114 to remove threaded joint lash.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A vehicle comprising:
   a pair of front wheels including a driver-side front wheel and a passenger-side front wheel;
   a steering assembly operatively connected with both the driver-side front wheel and the passenger-side front wheel and having:
   a steering center link;

a knuckle steer arm connected with the driver-side front wheel; wherein the knuckle steer arm defines a first opening and has an inner surface extending coaxially with the first opening; wherein internal threads are defined by the inner surface; wherein the knuckle steer arm has a second internally-threaded opening adjacent the first opening;

a tie rod connected with the steering center link;

a tie rod ball stud with a ball portion seated in the tie rod;

a ride steer adjustment device including an annular insert sleeve having a central opening configured so that the tie rod ball stud extends through the central opening and the insert sleeve has an interference fit with the tie rod ball stud;

wherein the insert sleeve has external threads coaxial with the central opening that are configured to be threaded to the internal threads of the knuckle steer arm, a distance between the knuckle steer arm and the tie rod thereby being adjustable by turning the insert sleeve relative to the knuckle steer arm to move the insert sleeve along the internal threads to adjust the ride steer of the driver-side front wheel without affecting ride steer of the passenger-side front wheel;

a threaded pin extending through the second internally-threaded opening in the knuckle steer arm;

wherein the insert sleeve has a body portion coaxial with the central opening and has a flange extending radially outward from the body portion; wherein the flange has an outer edge and defines detents at the outer edge; wherein the flange is positioned between the knuckle steer arm and the tie rod when the insert sleeve is threaded into the knuckle steer arm; and wherein the threaded pin is configured to be selectively positionable to engage one of the detents, thereby locking the insert sleeve, and is configured to be selectively retractable to permit the flange to be turned, the distance thereby being adjustable by turning the flange to move the insert sleeve along the internal threads.

2. The vehicle of claim 1, wherein the flange circumscribes the tie rod ball stud.

3. The vehicle of claim 1, wherein the detents are configured so that turning the flange sufficiently to cause one detent to pass the threaded pin adjusts the distance by substantially one tenth of one millimeter.

4. The vehicle of claim 3, wherein the flange has twenty detents and the external threads have a thread pitch of two millimeters.

5. The vehicle of claim 1, wherein the knuckle steer arm has a boss ring that defines the first opening; wherein the boss ring has a split; and further comprising:

a pinch bolt extending through the boss ring across the split and configured to be turnable in one direction to loosen the boss ring around the insert sleeve to ease adjustment of the insert sleeve, and in an opposing direction to tighten the boss ring around the insert sleeve after adjustment of the insert sleeve.

6. The vehicle of claim 1, wherein the tie rod ball stud has a stud portion with a frustoconical shape; and wherein the central opening of the insert sleeve is sufficiently tapered to allow the interference fit with the stud portion.

7. The vehicle of claim 1, further comprising:

a vehicle body operatively connected to the wheels;

an active suspension system operatively connected to the vehicle body and configured to counteract vertical forces acting through the wheels on the vehicle body.

8. A steering assembly for a vehicle comprising:

a steering center link;

a knuckle steer arm; wherein the knuckle steer arm defines a first opening extending completely through the knuckle steer arm and having internal threads;

a tie rod connected with the steering center link;

a tie rod ball stud with a ball portion seated in the tie rod and having an unthreaded frustoconical portion;

a ride steer adjustment device including an annular insert sleeve having a central opening configured so that the tie rod ball stud extends through the central opening and the insert sleeve has an interference fit with the frustoconical portion of the tie rod ball stud;

wherein the tie rod ball stud has an externally-threaded portion arranged so that the frustoconical portion is between the ball portion and the externally-threaded portion;

a threaded nut threaded to the externally-threaded portion of the tie rod ball stud; and wherein the insert sleeve has external threads coaxial with the central opening;

wherein the external threads of the insert sleeve are configured to be threaded to the internal threads of the knuckle steer arm, a distance between the knuckle steer arm and the tie rod thereby being adjustable by turning the insert sleeve relative to the knuckle steer arm to move the insert sleeve along the internal threads to adjust ride steer.

9. The steering assembly of claim 8, wherein the knuckle steer arm has a second opening adjacent the first opening, the steering assembly further comprising:

a pin extending through the second opening in the knuckle steer arm;

wherein the insert sleeve has a body portion coaxial with the central opening and has a flange extending radially outward from the body portion; wherein the flange has an outer edge and defines detents at the outer edge; wherein the flange is positioned between the knuckle steer arm and the tie rod when the insert sleeve is threaded into the knuckle steer arm;

wherein the pin is configured to be selectively positionable to engage any one of the detents, thereby locking the insert sleeve, and is configured to be selectively retractable to permit the flange to be turned, the distance thereby being adjustable by turning the flange to move the external threads of the insert sleeve along the internal threads of the knuckle steer arm.

10. The steering assembly of claim 9, wherein the flange circumscribes the tie rod ball stud.

11. The steering assembly of claim 9, wherein the detents are configured so that turning the flange sufficiently to cause one detent to pass the pin adjusts the distance by substantially one tenth of one millimeter.

* * * * *